United States Patent [19]

Osawa et al.

[11] Patent Number: 4,937,497
[45] Date of Patent: Jun. 26, 1990

[54] ON-VEHICLE BRAKE LAMP APPARATUS

[75] Inventors: Takashi Osawa; Katsuo Murakami; Teruyoshi Noda; Seishiro Mitsuhashi; Yujiro Kamano, all of Kanagawa, Japan

[73] Assignee: Minolta Camera Kabushiki Kaisha, Tokyo, Japan

[21] Appl. No.: 293,455

[22] Filed: Jan. 4, 1989

[30] Foreign Application Priority Data

Jan. 5, 1988 [JP] Japan .................................. 63-564

[51] Int. Cl.$^5$ .............................................. B60Q 1/44
[52] U.S. Cl. ........................................ 315/77; 315/94; 315/98; 315/DIG. 4
[58] Field of Search ............... 315/77, DIG. 4, 94, 315/98; 307/10.8

Primary Examiner—Eugene R. LaRoche
Assistant Examiner—Ali Neyzari
Attorney, Agent, or Firm—Burns, Doane, Swecker & Mathis

[57] ABSTRACT

A brake lamp apparatus causes a neon discharge lamp to light up instantly even when the vehicle key is not inserted into the key hole of the vehicle e.g., when the vehicle is being parked. A neon discharge lamp utilized in the apparatus is pre-heated but cathodes thereof to instantly light up in hot cathode discharge mode upon depression of a brake pedal when a generator drivingly connected with an engine is operating, whereas the hot cathodes of the lamp are not pre-heated but the lamp can still light up instantly in cold cathode discharge mode upon depression of the brake pedal when the generator is operating. Even if the filament coils of the lamp become cut off suddenly while the vehicle is running, the lamp can still light up, being shifted to in cold cathode discharge method, thereby overcoming a drawback that the brake lamp goes off suddenly due to a filament cut-off during running on a road.

2 Claims, 3 Drawing Sheets

4,937,497

ON-VEHICLE BRAKE LAMP APPARATUS

BACKGROUND OF THE INVENTION

1. Field of the Invention

This invention relates to an on-vehicle brake lamp which lights up or light out in interlocked relation with brake operation of a vehicle.

2. Prior Art

Conventionally, incandescent bulbs have been used as on-vehicle stop lamps of vehicles that are lighted up or lighted out by means of a switch drivinly connected to a brake pedal. Recently in U.S.A., a second stop lamp called a high mount stop lamp, mounted near a rear window, has been obligated by law. Also in Japan, many vehicles have been equipped with such stop lamps these days since this type of stop lamp exhibits good visibility to other drivers following behind, reducing rate of accidents. The lamps used for the high mount stop lamp, however, are of the same type as that of stop lamps at the rear of the vehicles, i.e., conventional incandescent light bulbs. An incandescent lamp suffers from a drawback that it takes a long time, for example many tens msec, before it emanates a light after it is switched on. Recently, rare gas discharge lamp such as a neon gas lamp began to be used as an on-vehicle high mount stop lamp and the like for its good light emitting efficiency and low power dissipation. This was reported by a news paper NIKKEI SANGYO SHIMBUN on Sept. 30, 1988 in Japan. The amount of light emitted by the neon lamp increases with increasing discharge current. Conventionally, a neon discharge lamp has been of a cold cathode type. The cold cathode discharge lamp has a limited maximum amount of light obtained; therefore a hot cathode type neon discharge lamp such as that disclosed in U.S. Pat. No. 4461981 has been preferred. Heating the hot cathodes at all times allows the lamp to light up in a short time but the lamp sometimes needs be lighted up rapidly even when the hot cathodes are not heated, for example, when a vehicle key is not inserted into the key hole of the vehicle. Therefore the time required for the hot cathode lamp to light up can be a problem. The present invention was made to overcome the aforementioned drawbacks.

SUMMARY OF THE INVENTION

An object of the invention is to provide a brake light apparatus in which the brake light lights up instantly even the vehicle key is not inserted into the key hole of the vehicle e.g., the vehicle is being parked.

Another object of the invention is to provide a brake light apparatus in which even if the filament coils of the lamp become cut off suddenly while the vehicle is running, the lamp can still light up, being shifted to in cold cathode discharge method, thereby overcoming a drawback that the brake lamp goes off suddenly due to a filament cut-off during running on a road. A neon discharge lamp of the apparatus used in the present invention is pre-heated hot cathode thereof to instantly light up in hot cathode discharge method upon depression of a brake pedal when a generator drivingly connected with an engine is operating, whereas the hot cathodes of the lamp are not pre-heated but the lamp can be lighted up in cold cathode discharge method upon depression of the brake pedal when the vehicle key is not inserted into the key hole of the vehicle.

BRIEF DESCRIPTION OF THE DRAWINGS

The above objects and other objects and advantages will become more apparent from the detailed description referring to the drawings in which.

DETAILED DESCRIPTION OF THE INVENTION

An embodiment of the invention will be described as follows.

Figure 2:
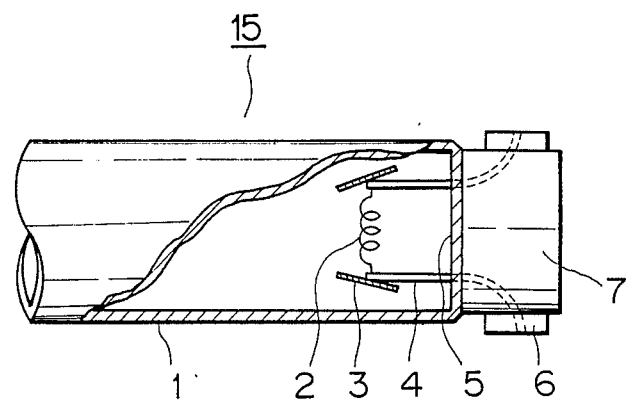
FIG. 2 is a cross-sectional view of a neon discharge lamp used in the present invention.

FIG. 2 is a cross-sectional view of a neon discharge lamp 15 used in the present invention, in which reference numeral 1 is a glass tube, 2 a hot cathode, 3 an anode, 4 a lead wire, 5 a stem, 6 a pin, and 7 a cap. In the figure, at the ends of the glass tube 15 are mounted the caps 7, from which the lead wires 4 extend into the glass tube 1 longitudinally and are provided with the hot cathodes 2 at the tip ends thereof. The anode 3 is mounted at the end of the hot cathode 2 on the lead wire 4 and extends into the tube 1 for protecting the hot cathode 2 against damage from discharge when the lamp 15 is lighted up in cold cathode discharge.

Figure 1:
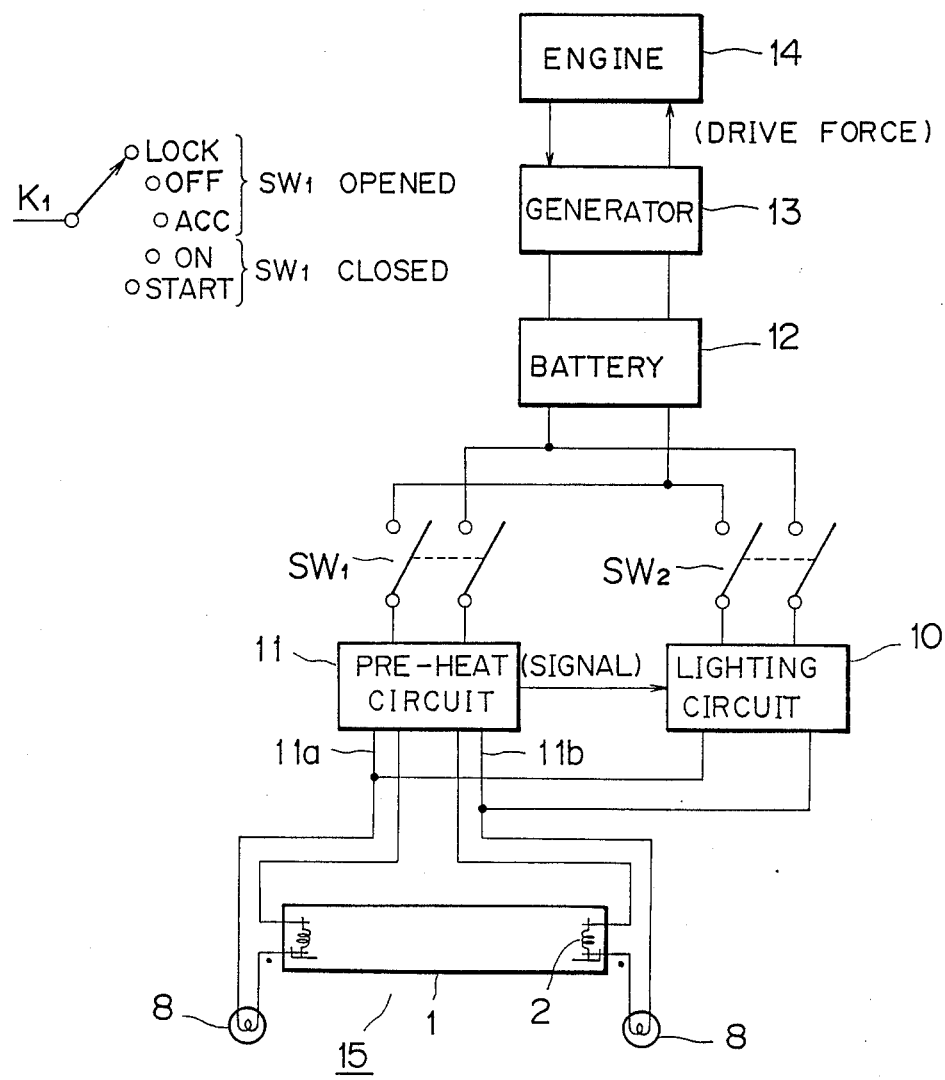
FIG. 1 is a block diagram illustrating an embodiment of an on-vehicle brake lamp apparatus according to the present invention.

Hot cathode discharge takes place between the anode 3 on one end of the glass tube 1 and the hot cathode 2 on the other end of the glass tube 1. This anode should be arranged to project into the discharge path from the hot cathode 2 for good protection result. The glass tube 1 is of a diameter of 15.5 mm and is charged neon gas of a pressure of 7 Torr therein. The hot cathode 2 is made of a triple filament coil on which electron-emitting substance is coated. The distance between the hot cathodes is 300 mm. Within the glass tube 1 is provided a sufficient amount of barium getter of evaporation type which attracts impure gas within the lamp to reduce density thereof, thereby stabilizing lamp characteristic. FIG. 1 is a block diagram for illustrating an apparatus for lighting up the neon discharge lamp 15. A lighting circuit 10 employs a high frequency inverter of 30 kHz and is adapted to provide a tube current of 500 mA. The hot cathodes 2 are heated by means of two separate pre-heat lines 11a and 11b, which are turned on upon closure of a switch SW1. The switch SW2 is drivingly connected with a brake pedal and closes when the pedal is depressed. A switch SW1 is drivingly connected with the vehicle key K1 and closes when the vehicle key K1 is positioned at any one of "START" and "ON" and opens when the vehicle key K1 is positioned at any one of "ACC", "OFF", and "LOCK". In series with the respective pre-heat lines 11a, 11b are connected small lighting bulbs 8 which light out to alarm the operator when the hot cathodes 2 are cut off.

The lighting circuit 10 is connected with a battery 12 and provides a discharge initiating voltage, often called a kick voltage. The lighting circuit 10 provides a hot cathode discharge voltage in response to a signal from the pre-heat circuits when the switch SW2 is closed with the SW1 being closed, and provides a cold cathode discharge voltage in response to the signal from the pre-heat circuit when the switch SW2 is closed with the SW1 being opened.

Figure 3:
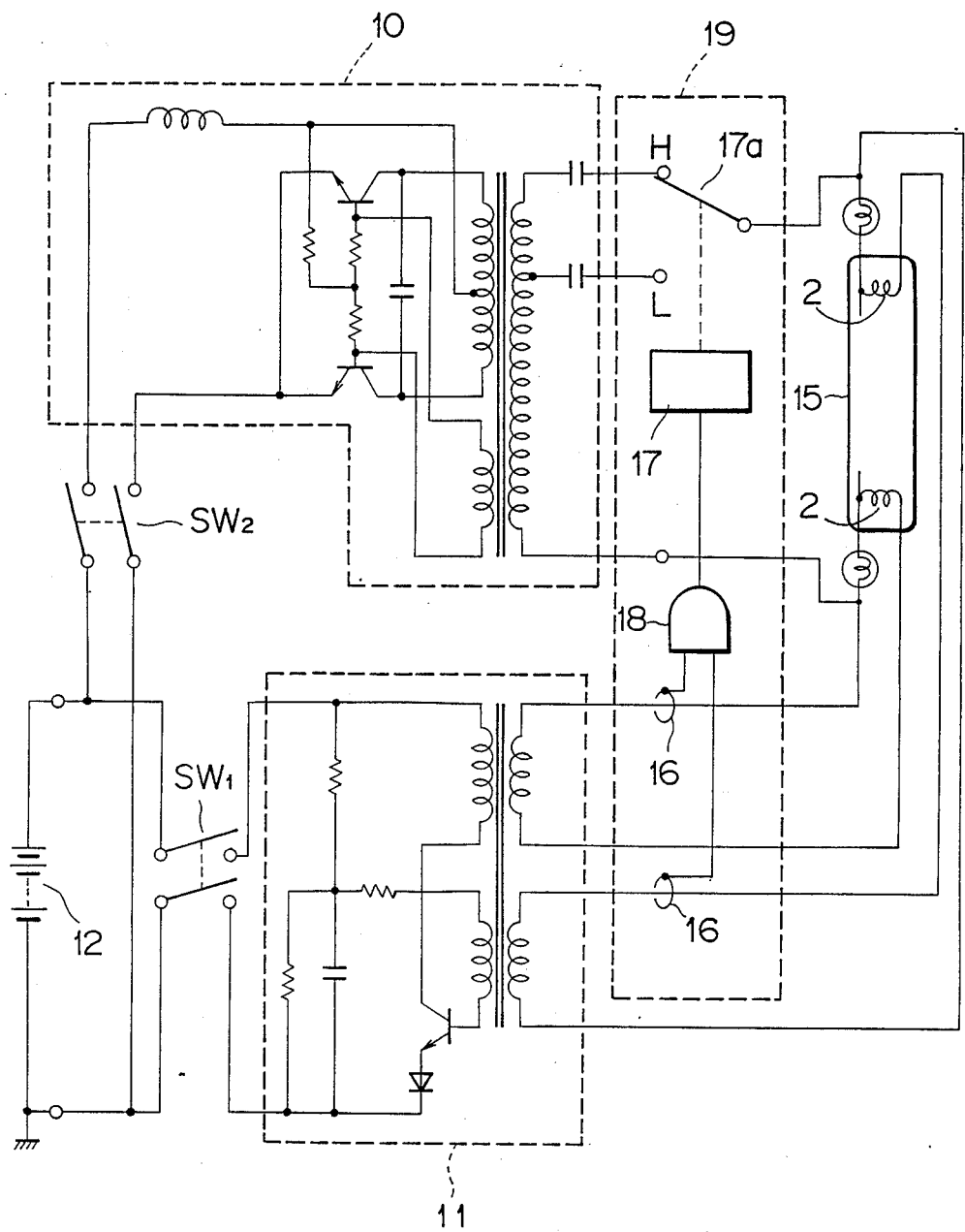
FIG. 3 is a circuit diagram for illustrating a preheat circuit and a lighting circuit.

FIG. 3 illustrates a specific example of the lighting circuit 10 and the pre-heat circuit 11 shown in FIG. 1. In FIG. 3, a pre-heat current detection circuit 19 is connected between the lighting circuit 10 and the pre-heat circuit 11. The pre-heat lines 11a and 11b are coupled with sensor elements or CT's 16 of the pre-heat current detection circuit 19. When the filament coils 2 of the lamp 15 are pre-heated normally, the circuit 19 detects the pre-heat current by means of the CT's 16 and then causes the relay 17 to select "L" of the output terminals of the lighting circuit 10, thereby providing a lower voltage.

FIG. 3 shows a case in which the switch SW1 is at any one of the positions "ACC", "OFF", and "LOCK". Since the switch SW1 is open, the filament coils 2 of the lamp 15 are not pre-heated. Thus the CT's 16 detect no current, an AND circuit 18 will not output a signal for energizing the relay 17. Thus the relay 17 remains at the position "H". Thus the output voltage of the lighting circuit 10 is high. With this condition, if the brake is depressed, then the switch SW2 is caused to close. Then the lighting circuit 10 provides the voltage high enough for the lamp 15 to discharge, the lamp 15 thus lights up. In the case where the lamp 15 is unable to discharge in hot cathode discharge mode due to cut-off of the filament or not being heated normally even though the vehicle key K1 is at the position "ON" or "START", the above arrangement permits the lamp 15 to still light up in the cold cathode discharge mode.

In the case where the vehicle key K1 is at the position "ON" or "START" and the filament coils 2 are being heated normally, the CT's 16 detect the pre-heat current to cause the output terminal "L" of the light-up circuit 10 to be selected. Thus the lamp 15 is supplied with a voltage high enough for it to start the hot cathode discharge when the switch SW2, which is drivingly operated with the brake pedal, is closed.

The apparatus can also be arranged in such a way that absence of the filament current is detected by the CT's 16 after the brake lamp comes on through the cold cathode discharge; and then a signal indicative of absence of the filament current, in the form of a contact of the relay 17, is fed back to the switch SW1, thereby causing the switch SW1 to close; the switch SW1, in turn, activates the pre-heat circuit 11 to heat the hot cathodes of the lamp, thereby the lamp shifting from the cold cathode discharge to the hot cathode discharge. By this arrangement, the lamp can be lighted up with an adequate amount of light even when the vehicle key K1 is not inserted into the key hole.

The brake lamp apparatus thus arranged operates as follows.

When the engine is operating, the battery 12 is charged through a generator 13 driven into rotation by the engine 14. The battery supplies the lamp 15 with electric power through the lighting circuit 10 and the pre-heat circuit 11, thereby pre-heating the hot cathodes of the lamp 15. When the brake pedal is depressed with the pre-heat circuit 11 being operative, the hot cathode discharge occurs in about 10 ms within the lamp 15, emitting a red light. At this time the lamp 15 consumes an electric power of about 20 W and lights up more brightly than in the cold cathode discharge, showing good visibility.

On the other hand, when the engine is not operating, the switch SW1 is opened. Then the switch SW2 is closed if the brake pedal is depressed, thereby lighting up the lamp 15 in the cold cathode discharge method.

Although a high frequency current is allowed to flow through the pre-heat circuit 11 in the above mentioned embodiment, it is only exemplary. Instead the hot cathode may be heated by direct current supplied from the battery through a switch for the sake of simplicity of the pre-heat circuit.

The kick voltage for the hot cathode discharge can be set equal to that for the cold cathode discharge so that only one voltage is required for the lamp to light up in either discharge modes, requiring only one circuit.

What is claimed:

1. A brake lamp apparatus comprising:
   a neon discharge lamp having hot cathodes;
   a lighting circuit for outputting a high voltage for causing discharge in said neon discharge lamp;
   a pre-heat circuit for producing current to pre-heat said hot cathodes;
   a first switch connected with a battery and drivingly connected with a vehicle key operation, said first switch being closed to apply a battery power to said pre-heat circuit when said vehicle key is at an "ON" position, said first switch being open at least when said vehicle key is not inserted into a key hole of the vehicle;
   a second switch connected with said battery and drivingly connected with a brake pedal of said vehicle, said second switch being closed to apply a battery power to said lighting circuit when said brake pedal is depressed.

2. A brake lamp apparatus according to claim 1, wherein said high voltage includes a first high voltage and a second high voltage higher than said first high voltage;
   said brake lamp apparatus further comprising a pre-heat current detection circuit for detecting said preheat current supplied to said hot cathodes and for selectively applying said first and second high voltages said hot cathodes, said pre-heat current detection circuit applying said first high voltage when said pre-heat current is detected and applying said second high voltage when said pre-heat current is not detected.

* * * * *

UNITED STATES PATENT AND TRADEMARK OFFICE
CERTIFICATE OF CORRECTION

PATENT NO. : 4,937,497
DATED : June 26, 1990
INVENTOR(S) : Takashi OSAWA

It is certified that error appears in the above-identified patent and that said Letters Patent is hereby corrected as shown below:

ON TITLE PAGE:
[73]    Assignee:    Mitsubishi Denki Kabushiki Kaisha
                     Tokyo, Japan Signed and Sealed this Twenty-seventh Day of August, 1991

Attest:

HARRY F. MANBECK, JR.

Attesting Officer

Commissioner of Patents and Trademarks